(12) United States Patent
Herb et al.

(10) Patent No.: US 12,102,954 B2
(45) Date of Patent: Oct. 1, 2024

(54) FILTER ELEMENT FOR FILTERING A DEVICE

(71) Applicant: Mahle International GmbH, Stuttgart (DE)

(72) Inventors: Matthias Herb, Ebersbach (DE); Ralf Disson, Leutenbach (DE)

(73) Assignee: Mahle International GmbH (DE)

( * ) Notice: Subject to any disclaimer, the term of this patent is extended or adjusted under 35 U.S.C. 154(b) by 619 days.

(21) Appl. No.: 17/145,279

(22) Filed: Jan. 8, 2021

(65) Prior Publication Data
US 2021/0213380 A1    Jul. 15, 2021

(30) Foreign Application Priority Data
Jan. 9, 2020    (DE) ...................... 10 2020 200 212.6

(51) Int. Cl.
*B01D 46/10* (2006.01)
*B01D 46/16* (2006.01)
*B01D 46/52* (2006.01)

(52) U.S. Cl.
CPC .......... *B01D 46/103* (2013.01); *B01D 46/16* (2013.01); *B01D 46/523* (2013.01); *B01D 2271/02* (2013.01); *B01D 2279/40* (2013.01)

(58) Field of Classification Search
CPC .... B01D 46/103; B01D 46/16; B01D 46/523; B01D 2271/02; B01D 2279/40
USPC .......................................................... 55/502
See application file for complete search history.

(56) References Cited

U.S. PATENT DOCUMENTS

| 6,248,155 | B1* | 6/2001 | Seaman ................. F24F 6/043 261/99 |
| 9,873,073 | B2 | 1/2018 | Enderich |
| 9,919,256 | B2 | 3/2018 | Mbadinga-Mouanda |
| 2006/0005518 | A1* | 1/2006 | Duffy .................. B01D 46/523 55/497 |
| 2009/0313960 | A1* | 12/2009 | Felber ................. B01D 46/521 55/490 |

(Continued)

FOREIGN PATENT DOCUMENTS

| CN | 103269764 A | 8/2013 |
| CN | 103511138 A | 1/2014 |

(Continued)

OTHER PUBLICATIONS

English translation of First Office Action and Search Report dated Apr. 21, 2022 for CN-202110029373.1.

(Continued)

*Primary Examiner* — Robert A Hopkins
*Assistant Examiner* — Qianping He
(74) *Attorney, Agent, or Firm* — Fishman Stewart PLLC (57) ABSTRACT

A filter element may include a filter medium extending in an extension direction and including a filter material separating clean and raw sides of the filter element, and two seals arranged at two end faces of the filter medium located opposite one another in the extension direction, so that an inner side of each seal may be arranged lying against the associated end face in a fluid-tight manner. The two inner sides, jointly with an inner circumferential side of the filter medium, may partly limit a filter element interior space. The filter medium, in a section running perpendicularly to the extension direction, has an open U-geometry or V-geometry with two legs.

19 Claims, 7 Drawing Sheets

(56) References Cited

U.S. PATENT DOCUMENTS

| | | | |
|---|---|---|---|
| 2010/0326028 A1* | 12/2010 | Sundet | B01D 39/1623 |
| | | | 55/499 |
| 2011/0113736 A1* | 5/2011 | Raether | B01D 46/525 |
| | | | 55/486 |
| 2016/0236132 A1* | 8/2016 | Hara | B01D 46/0001 |
| 2017/0361257 A1* | 12/2017 | Worrall | |
| 2020/0398194 A1* | 12/2020 | Savstrom | B01D 29/21 |
| 2022/0063698 A1* | 3/2022 | Karlsson | B60N 2/2845 |

FOREIGN PATENT DOCUMENTS

| | | | | |
|---|---|---|---|---|
| CN | 104349831 A | | 2/2015 | |
| DE | 102012012347 A1 | | 12/2013 | |
| DE | 102015115984 A1 | | 3/2017 | |
| DE | 102016005555 A1 | * | 11/2017 | |
| EP | 2676713 A1 | * | 12/2013 | B01D 46/103 |

OTHER PUBLICATIONS

English abstract for CN-103511138.
German Search Report for DE-102020216484.3, dated Aug. 17, 2021.
English abstract for DE-102015115984.
English abstract for DE-102012012347.

* cited by examiner

FILTER ELEMENT FOR FILTERING A DEVICE

CROSS-REFERENCE TO RELATED APPLICATIONS

This application claims priority to German Patent Application No. DE 10 2020 200 212.6, filed on Jan. 9, 2020, the contents of which are hereby incorporated by reference in its entirety.

TECHNICAL FIELD

The invention relates to a filter element for a filtering device, preferentially for an air filter of a motor vehicle.

BACKGROUND

Filter elements for filtering devices, in particular for air filters of a motor vehicle, have been embodied for some time with a filter medium through which air can flow, which has a U-geometry or a V-geometry. For the filtration of dirt carried along in air, the filter medium is impermeable to such dirt, whereas the filter medium is permeable to air. The U-geometry or V-geometry of the filter medium present in conventional filter elements can be particularly easily created by bending or folding the filter material forming the filter medium. Accordingly, such filter elements with U- or V-shaped filter medium are characterized by low manufacturing costs.

However, the fact that they are comparatively bulky and accordingly can only be employed with substantial difficulties in confined space conditions—in particular in vehicle manufacture—proves to be disadvantageous with such filter elements.

SUMMARY

It is therefore an object of the present invention to show new ways for filter elements, which are suitable for filtering devices, in particular for air filters of a motor vehicle, in particular for eliminating the abovementioned disadvantage.

This object is solved through the subject matter of the independent claim(s). Preferred embodiments are the subject matter of the dependent patent claim(s).

Accordingly, the basic idea is to provide a filter element for a filtering device, in particular for an air filter of a motor vehicle, which has a filter medium with an arcuately formed inner circumferential side. In this way, the filter element can be particularly favourably matched to a given and confined installation space. Consequently, this installation space is particularly completely utilisable. This is particularly important for an application in motor vehicles since little installation space is typically available there.

A filter element for a filtering device according to the invention, in particular for an air filter of a motor vehicle, comprises a filter medium which extends in an extension direction and which comprises a filter material. The filter medium of the filtering element separates a clean side of the filter element from a raw side of the filter element in an air-permeable manner. Here, the filter medium, in a section perpendicularly to the extension direction, has an open U-geometry or V-geometry with two legs. This means that the filter medium with the U- or V-geometry is formed U- or V-shaped in the section perpendicularly to the extension direction. Such a U-geometry or V-geometry can be formed over its course free of holes, i.e. continuously, as well as folded once or multiple times, i.e. non-continuously and is characterized in particular in that it has a closed and an open end. In addition, the filter element comprises two sealing elements which are arranged on two end faces of the filter medium located opposite one another in the extension direction. Here, the sealing elements are arranged in such a manner that an inner side of the respective sealing element is arranged lying against the associated end face of the filter medium in a fluid-tight manner. Jointly with the inner circumferential side of the filter medium, the two inner sides of the sealing elements partly limit a filter element interior space. Advantageously, such a filter element, as already explained, is advantageously producible particularly cost-effectively and in addition proves to be particularly effective.

In an advantageous further development of the filter element, the filter medium, in the section running perpendicularly to its extension direction, has an arcuately formed inner circumferential side. Advantageously, such an arcuately formed inner circumferential side is particularly easily creatable by bending the filter material of the filter medium.

A further advantageous further development of the filter element provides that the filter element interior space tapers from a first of the end faces to a second of the end faces in the extension direction. Such a tapering of the filter element interior space can be practically formed by means of a distance diminishing over the extension direction of the filter medium between the legs, which is measured perpendicularly to the extension direction, and/or by means of a height of the filter element interior space diminishing along the extension direction, which is measured perpendicularly to the extension direction from a closed end of the U-geometry or V-geometry of the filter medium in the direction away from the filter element interior space. Advantageously, this has the consequence that the filter element can be particularly favourably matched to a tapering installation space.

According to a further advantageous further development of the filter element, the two legs each form a terminal surface of the filter medium at an end of the U-geometry or V-geometry that is open in the section perpendicularly to the extension direction. There, the two terminal surfaces each formed by one of the legs are arranged in parallel or at an angle to one another. Advantageously, this offers a further particularly simple possibility of matching the filter element to a given, confined installation space.

In a further preferred further development of the filter element, an end strip of the respective leg each is arranged on the legs for forming the terminal surfaces. Advantageously, such end strips have a mechanically stabilising effect on the filter material of the filter medium.

According to a further preferred further development of the filter element, the filter element with U-geometry or V-geometry is formed axisymmetrically in the section perpendicularly to the extension direction. By way of this, it can be advantageously achieved that the filter medium can be particularly evenly flowed through by air.

In a further advantageous further development of the filter element, the filter medium with U-geometry or V-geometry is not formed axisymmetrically in the section perpendicularly to the extension direction. Preferentially, the filter medium with U-geometry or V-geometry is formed asymmetrically in the section perpendicularly to the extension direction. Here, the legs of the U-geometry or V-geometry are particularly preferably formed differently relative to one another. This advantageously allows matching the filter element even more precisely to a given, confined installation space._

According to a further preferred further development of the filter element, the end faces of the filter medium are arranged angularly relative to one another. Practically, the end faces of the filter medium are arranged acute-angularly relative to one another. This produces the advantage that the filter element can be particularly favourably matched to a given installation space with two installation space boundary surfaces arranged angularly relative to one another.

In a further advantageous further development of the filter element, the filter material of the filter medium has multiple pleats, which have pleat tips, and which run along the extension direction of the filter medium. Here, the pleat tips of adjacent pleats are arranged spaced apart from one another in the section perpendicularly to the extension direction. Practically, the pleat tips of all adjacent pleats are arranged spaced apart from one another in the section perpendicularly to the extension direction. Advantageously, a surface of the filter material is enlarged by means of such pleats which allows a greater throughput of air flowing through the filter element.

A further preferred further development of the filter element provides that the filter material is formed from a flat product. This flat product has a structuring with elevations. For forming the filter medium, the flat product of the filter material is pleated in such a manner that the structuring of the filter material determines a minimum value of the spacing of adjacent pleat tips. Practically, this results in that part surfaces of a filter surface of the filter material present between the pleat tips are kept spaced apart. Advantageously, the surface area enlargement of the filter medium achieved by means of the pleats of the filter material is thus reliably ensured. Apart from this, the elevations of the structuring additionally increase the surface area of the filter medium.

According to a further advantageous further development of the filter element, the pleat tips are fixed in their spacing relative to one another by means of a fixing. Practically, the fixing is a polymer bead which connects the pleat tips by bridging in each case the spacing of two adjacent pleat tips. Such a polymer bead is practically formed by a strand-like dispensation of a polymer. By way of this, the spacing between the pleat tips can be particularly reliably ensured.

According to a further preferred further development of the filter element, the spacing of the pleat tips of adjacent tips are formed differently relative to one another in the section perpendicularly to the extension direction of the filter medium. Practically, the spacing of the pleat tips of adjacent pleats differs irregularly in the section perpendicularly to the extension direction of the filter medium. This makes possible a particularly good filtration of an air to be cleaned flowing through the filter medium of the filter element.

According to a further preferred further development of the filter element, the filter element is supported on a supporting device which is practically formed lattice-like. Particularly practically, this supporting device is arranged on the inner circumferential side of the filter element. Such a filter element is particularly resistant mechanically.

A further advantageous further development of the filter element provides that one of the sealing elements has an opening. By means of this opening, air can be fed to the filter element interior space or discharged from the same. There, a terminal plate is arranged on the terminal surfaces of the legs of the filter medium and on the sealing elements, lying against the same in a fluid-tight manner. This means that in the section perpendicularly to the extension direction an open end of the U-geometry or V-geometry is closed by means of the terminal plate. This makes possible an even better utilisation of given and confined installation space conditions in the case that a feeding of the air to be cleaned takes place laterally.

Practically, the sealing elements are formed plate-like. Advantageously, such sealing elements are particularly cost-effectively producible.

According to an advantageous further development of the filter element, the filter medium comprises at least two, in particular multiple, segments which are composed to form the filter medium. Preferentially, the segments of the filter medium are arranged lined-up along the extension direction of the same. Particularly preferably, two adjacent segments of the filter medium are connected to one another in a lap joint. Advantageously, the filter area that is available for cleaning the air can thus be enlarged particularly easily. At the same time, the filter element can be matched even more precisely to a given, confined installation space.

In a preferred further development of the filter element, at least one of the sealing elements, viewing along the extension direction, is smaller in terms of area than an area content of the end face, on which the sealing element concerned is arranged, wherein preferably this sealing element is arranged within the filter element interior space at least in regions. Such a filter element is a particularly compact construction in terms of the extension direction.

According to a further advantageous further development of the filter element, the end faces of the filter medium each have an edge region facing away from the filter element interior space. There, the edge region of at least one of the end faces is free of the sealing element arranged at the end face concerned at least in sections, preferably completely. In addition to the inflow of air transversely to the extension direction, the filter medium can thus be advantageously subjected to inflow from the end face via the edge region along the extension direction or air flowing out of the filter medium can, additionally to the discharge transversely to the extension direction, be discharged via the edge region at the end face of the filter element along the extension direction, depending on whether the clean side or the raw side is present in the filter element interior space. Thus, the outflow area and the inflow area of the filter medium can be enlarged.

Practically, the edge region, viewing along the extension direction, has an open U-geometry or V-geometry which follows the inner circumferential side of the filter medium. By way of this, a particularly large outflow area or inflow area of the filter medium can be achieved.

In a further advantageous further development of the filter element, the pleats, on the inner circumferential side of the filter medium, are air-impermeably closed in the region of at least one of the end faces of the filter medium by means of a pocket bonding along the extension direction. The pocket bonding can thus be present in each of the pleats opening towards the filter element interior space. There, the pleats located opposite the inner circumferential side are free of pocket bonding so that the relevant edge region facing away from the inner circumferential side is air-permeable along the extension direction. In the pleats that are open towards the outside a pocket bonding is thus not required. Such a filter element is particularly cost-effectively producible. Practically, the pocket bonding can be created by applying a bead of glue or adhesive to the end face of the filter material, then folding the pleats of the filter material together and pressing the end faces of the folded pleats together while the glue or adhesive cures.

In a further preferred further development of the filter element, the filter element interior space is completely sealed in a fluid-tight manner at at least one of the end faces by means of the pocket bonding and the sealing element arranged at this end face along the extension direction or at least in a region apart from the opening of the sealing element—in the case that the sealing element concerned has such an opening. By means of such a filter element, the air to be cleaned by means of the filter element can be particularly favourably separated from dirt carried along therein.

Practically, the pocket bonding complements the sealing element present at the same end face in function and geometry. A filter element further development in such a manner is a particularly compact construction on the one hand and is characterized by particularly low manufacturing costs on the other hand.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
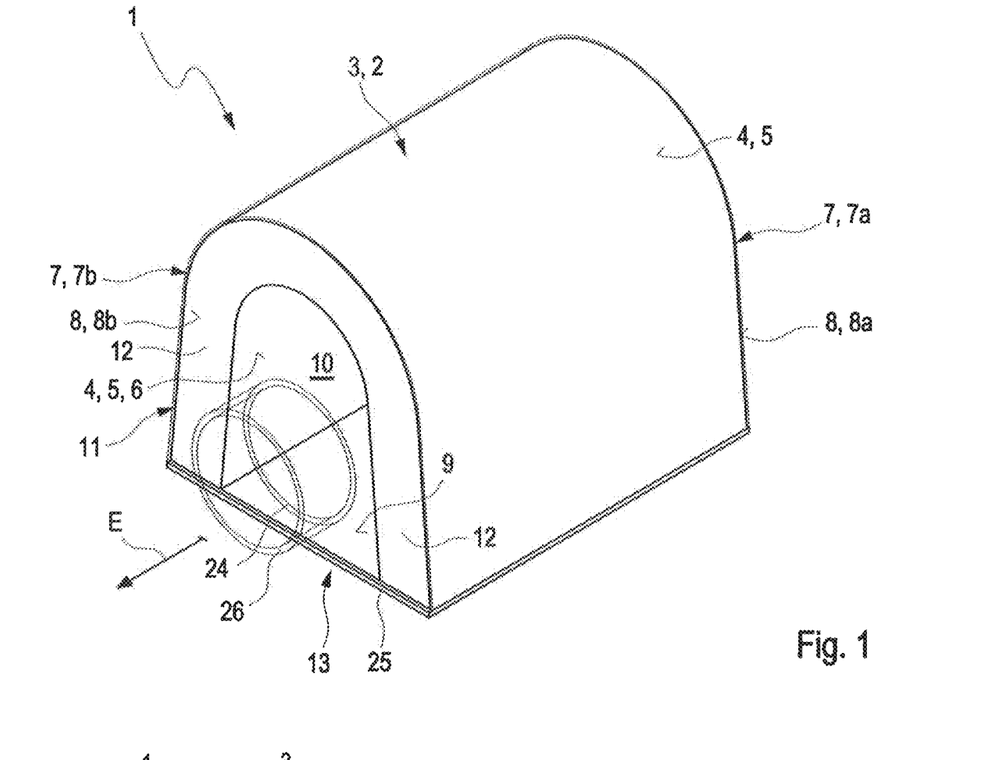
FIGS. 1 through 6 each shows an example of a filter element according to the invention in a perspective representation, FIG. 7 exemplarily shows a filter material for a filter element according to the invention in a plan view.

In FIG. 1, an example of a filter element 1 for a filtering device according to the invention is shown in a perspective representation, which practically is an air filter of a motor vehicle. It is noticeable that the filter element 1 comprises a filter medium 3. The filter medium 3 comprises a filter material 2 or consists of the filter material 2. The filter medium 3 with or of the filter material 2 extends along an extension direction E. The filter medium 3 separates a clean side 4 of the filter element 1 from a raw side 5 of the filter element 1 in an air-permeable manner. It is noticeable, furthermore, that the filter medium 3, in a section perpendicularly to the extension direction E, has an open U-geometry 11. This open U-geometry 11 comprises two legs 12. In the section running perpendicularly to the extension direction E, the filter medium 3 comprises an arcuately formed inner circumferential side 6. Depending on the through-flow direction, along which the filter medium 3 is flowed through by air, the inner circumferential side 6 is arranged either on the clean side 4 of the filter element 1 or on the raw side 5 of the filter element 1.

In addition, the filter element 1 comprises two sealing elements 7. The sealing elements 7 are arranged on two end faces 8 of the filter medium 3 located opposite one another in the extension direction E. There, the two sealing elements 7 are arranged at the end faces 8 of the filter medium 3 located opposite one another in the extension direction E in such a manner that an inner side 9 of the respective sealing element 7 is arranged lying against the associated end face 8 of the filter medium 3 in a fluid-tight manner. There, the two inner sides 9 of the sealing elements 7 partially limit a filter element interior space 10 jointly with the inner circumferential side 6 of the filter medium 3. As already indicated above, the clean side 4 of the filter element 1 or the raw side 5 of the filter element 1 can be arranged in the filter element interior space 10 depending on the through-flow direction of the filter medium 3.

The filter medium 3 of the filter element 1 is supported on a supporting device which for the sake of clarity however is not shown in the figures. Practically, such a supporting device is formed lattice-like and arranged on the inner circumferential side 6 of the filter element 1.

Figure 4:
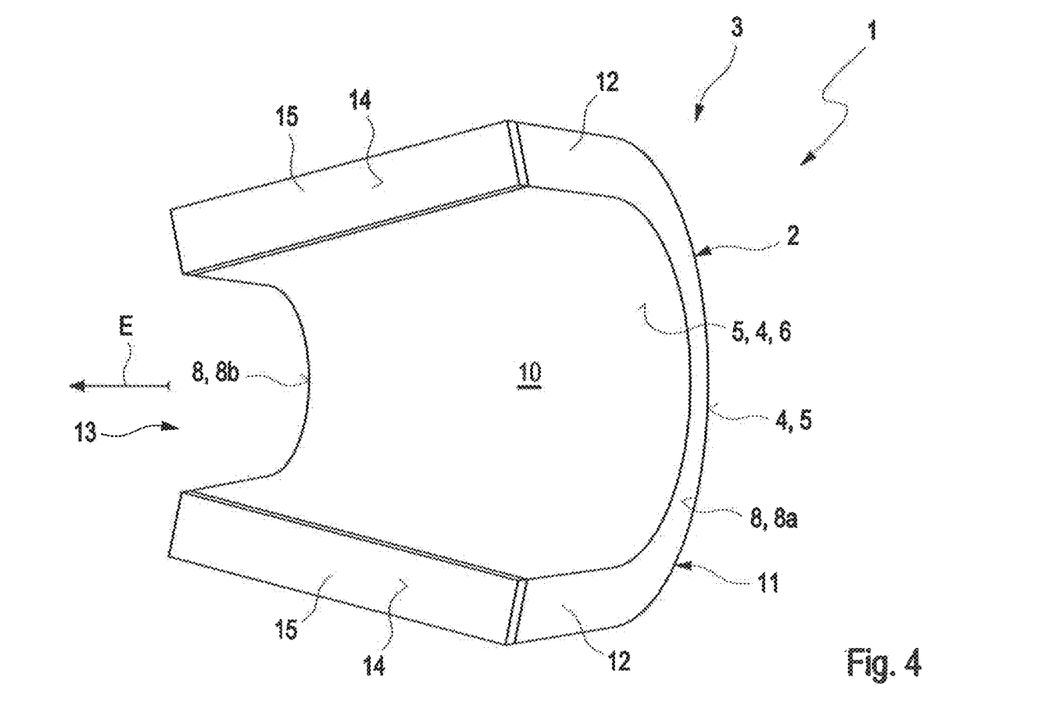
Figure 5:
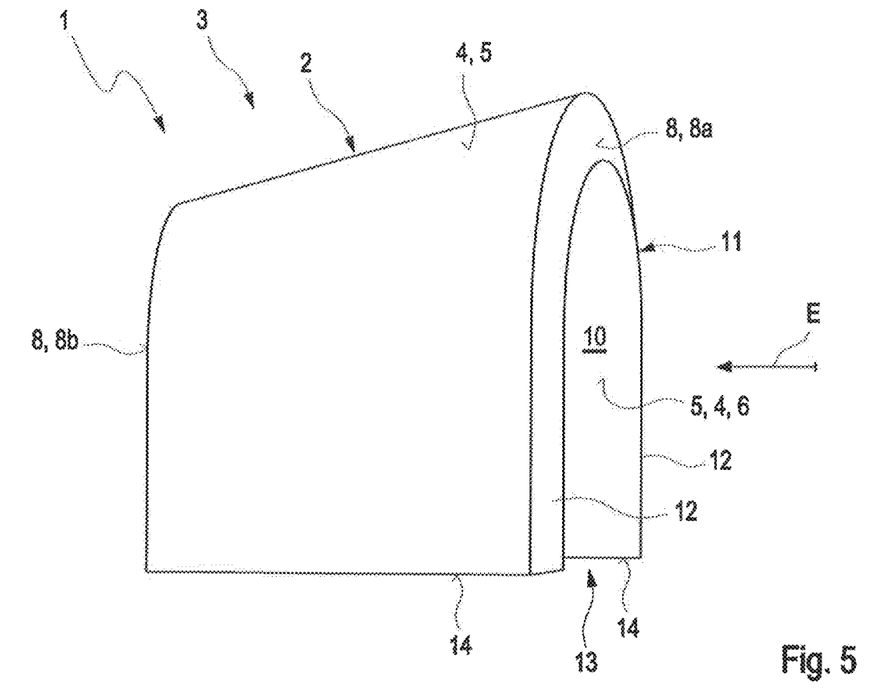

The FIGS. 4 and 5 show in perspective part representations further examples of filter elements 1 according to the invention. For reasons of clarity, the sealing elements 7 are not shown. According to the shown examples, the filter element interior space 10 tapers from one of the first end faces 8, 8a to one of the second of the end faces 8, 8b next to the extension direction E of the filter medium 3. It is noticeable, furthermore, that the two legs 12 of the U-geometry 11 in each case form a terminal surface 14 of the filter medium 3 at an end 13 of the U-geometry 11 that is open in the section perpendicularly to the extension direction E. Accordingly, these terminal surfaces 14 are arranged parallel to one another in the examples of FIGS. 4 and 5.

Figure 2:
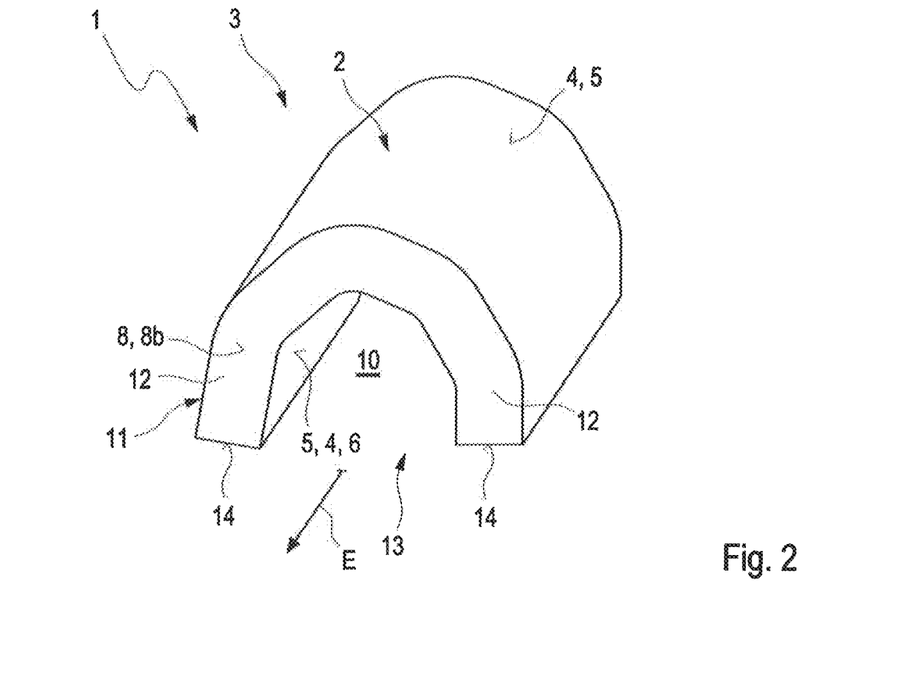

In FIG. 2, a further example for a filter element 1 according to the invention is shown in a perspective part representation. For reasons of clarity, the sealing elements 7 are not shown. According to this example, the two terminal surfaces 14 each formed by a leg 12 are arranged parallel and with an offset relative to one another. This means that the legs 12 are different in length in the section perpendicularly to the extension direction E.

Figure 6:
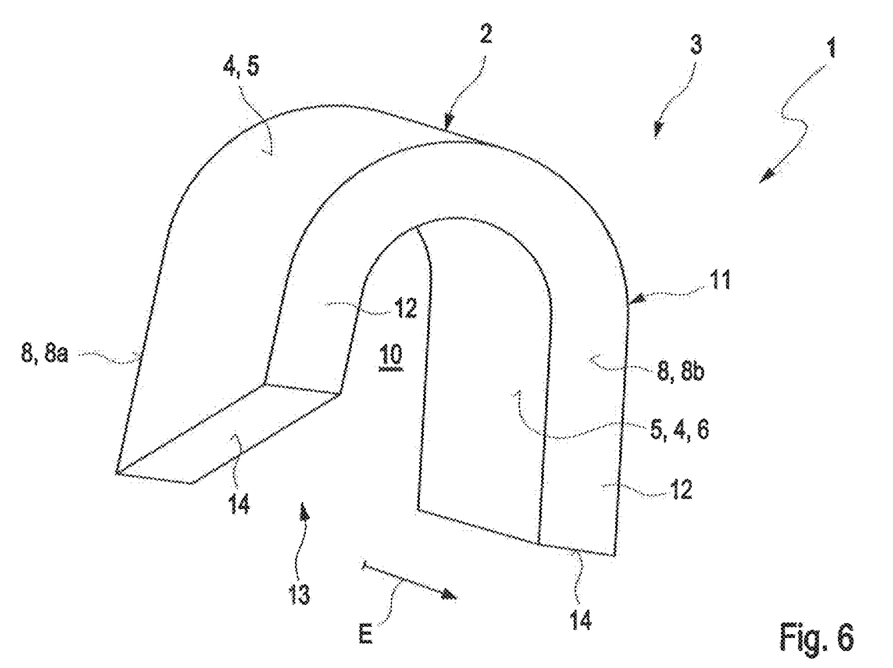

In FIG. 6, a further example for a filter element 1 according to the invention is shown in a perspective part representation. For reasons of clarity, the sealing elements 7 are not shown. According to this example, the two terminal surfaces 14 each formed by a leg 12 are arranged at an angle to one another.

From FIG. 4 it is additionally evident that for forming the terminal surfaces 14 on the legs 12 an end strip 15 each of the respective leg 12 is present. In the section perpendicularly to the extension direction E, the filter medium 3 with U-geometry 11 is formed axisymmetrically.

Alternatively to this, the filter medium 3 with U-geometry 11 is formed non-axisymmetrically in the section perpendicularly to the extension direction E according to the examples of FIG. 2 and FIG. 6. Practically, the filter medium 3 with U-geometry 11 in the version shown in the section perpendicularly to the extension direction E is formed asymmetrically. There, the legs 12 are formed preferably distinct from one another, as is evident in the shown examples.

Figure 3:
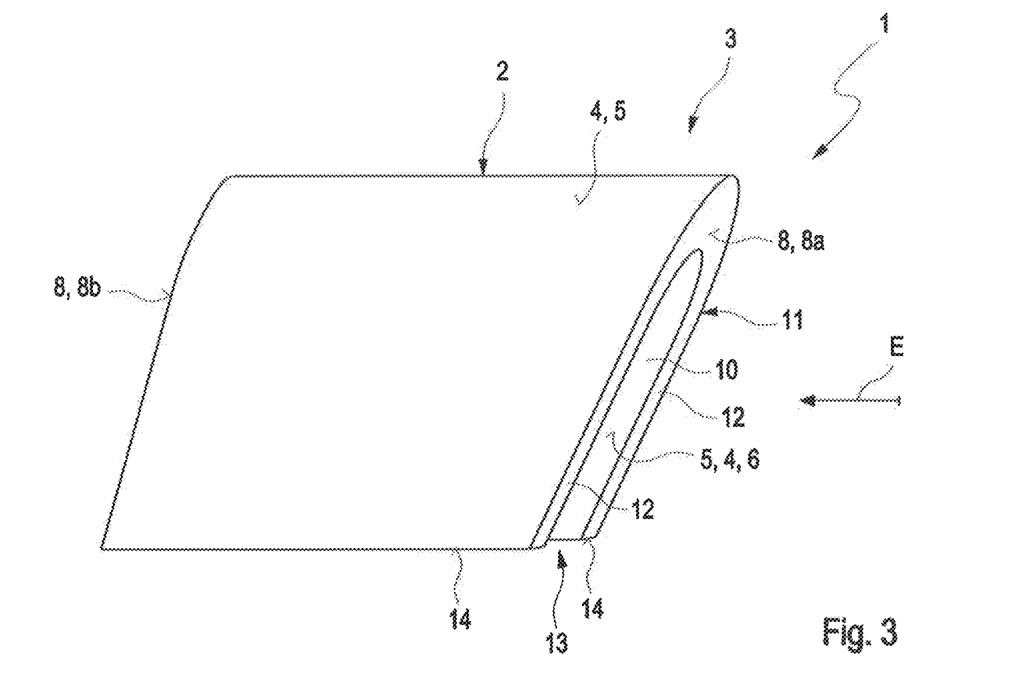

In FIG. 3, a further example of a filter element 1 according to the invention is likewise shown in a perspective part representation. For reasons of clarity, the sealing elements 7 are not shown. According to the shown example, the end faces 8 of the filter medium 3 are arranged angularly relative to one another. There, the end faces 8 of the filter medium 3 according to the shown example are arranged at an acute angle relative to one another.

Figure 8:
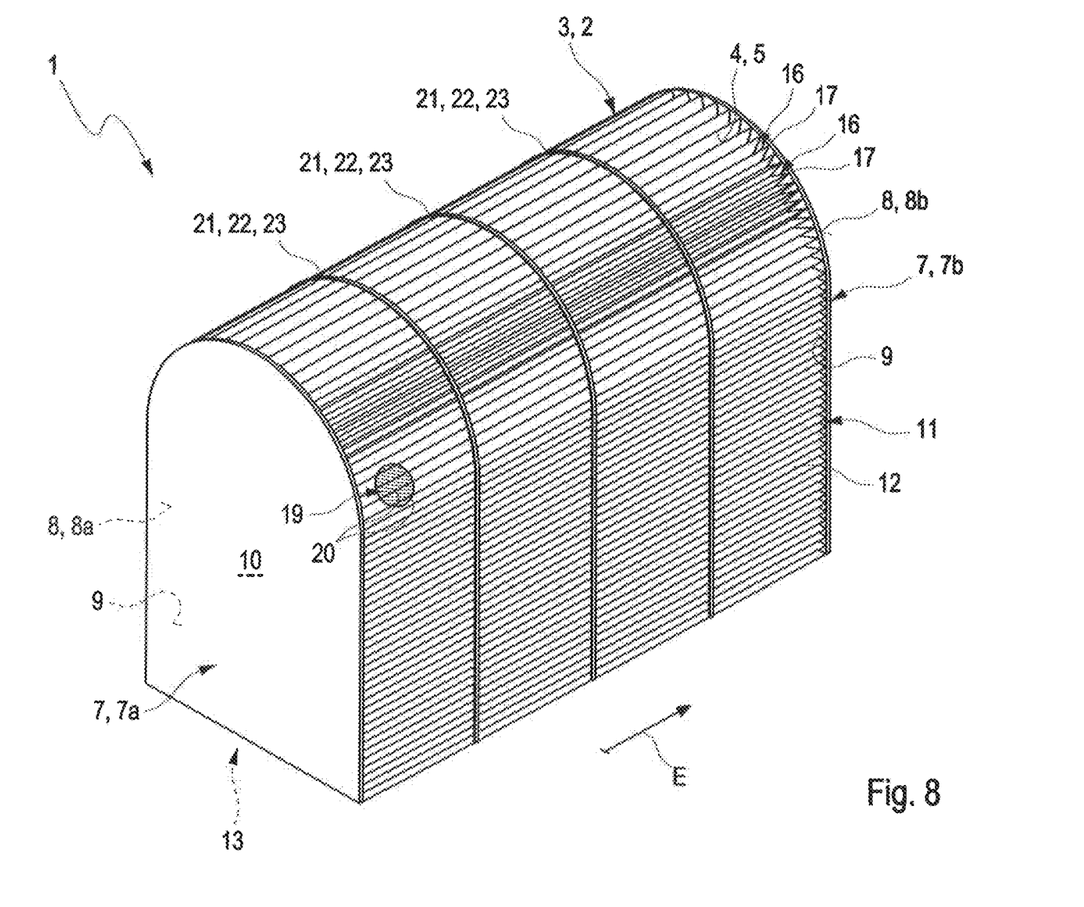
FIG. 8 shows a further example of a filter element according to the invention in a perspective representation.

In FIG. 8, a further example of a filter element 1 according to the invention is illustrated in a perspective representation. Accordingly, the filter material 2 of the filter medium 3 comprises multiple pleats 16 running along the extension direction E of the filter medium 3. The pleats 16 of the filter material 2 comprises pleat tips 17. There, the pleat tips 17 of two adjacent pleats 16 are arranged in the section perpendicularly to the extension direction E spaced apart from one another. Practically, the pleat tips 17 of all adjacent pleats 16 are arranged spaced apart from one another in the section perpendicularly to the extension direction E.

Figure 7:
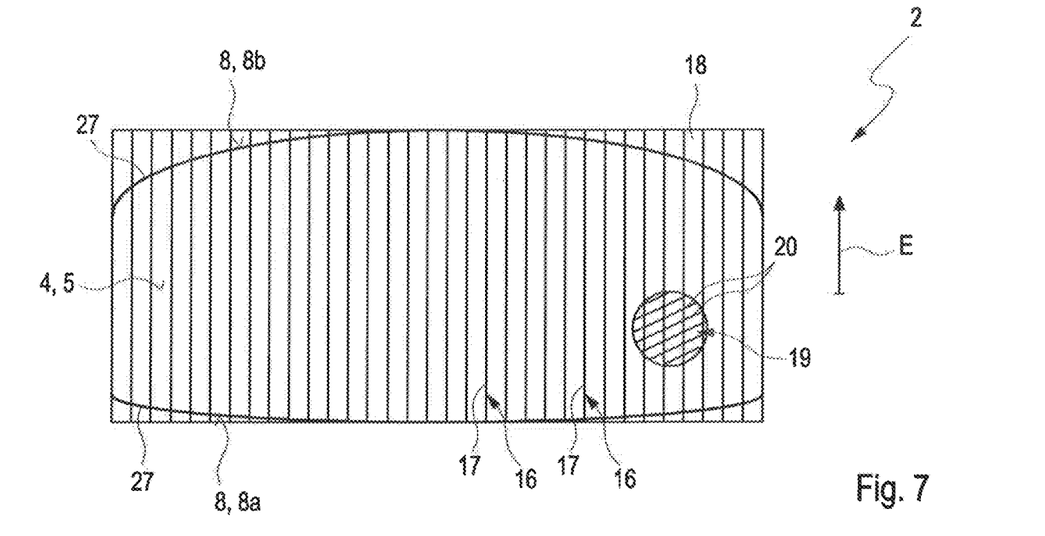

FIG. 7 shows in a plan view exemplarily a filter material 2 for a filter element 1 according to the invention. Accordingly, the filter material 2 is formed from a flat product 18. This flat product 18 comprises a structuring 19 with elevations 20. A filter material 2 structured in such a manner is referred to by the person skilled in the art in the field of air filter development as "napped" or "grooved". There, the flat product 18 is pleated in the filter element 1 in such a manner that the structuring 19 of the filter material 2 determines a minimum value of the distance of adjacent pleat tips 17, as exemplarily also illustrated in FIG. 8.

FIG. 8 additionally shows that the pleat tips 17 are fixed at their distance from one another by means of a fixing 21. This fixing 21 is practically a polymer bead 22 which connects the pleat tips 17 by bridging the spacing of each two adjacent pleat tips 17. Preferentially, the polymer bead 22 is an adhesive bead 23. Such a polymer bead 22 or adhesive bead 23 is practically formed by a strand-like dispensation of a polymer or of an adhesive. FIG. 8 additionally shows that the distances of the pleat tips 17 of adjacent pleats 16 deviate from one another in the section perpendicularly to the extension direction E of the filter medium 2. This means that the distances of the pleat tips 17 of adjacent pleats 16 practically deviate irregularly from one another.

By way of FIG. 1 it is evident, furthermore, that one of the sealing elements 7 has an opening 24. By means of this opening 24, air can be fed to the filter element interior space 10 or discharged from the same. The opening 24 can be surrounded by an opening collar 26 projecting connector-like from the sealing element 7 on the outside. There, a terminal plate 25 is arranged on the terminal surfaces 14 of the legs 12 of the filter medium 2 and on the sealing elements 7, lying against the same in a fluid-tight manner. It is additionally noticeable that the sealing elements 7 in the shown example are formed plate-like. Alternatively or additionally, the terminal plate 25 can comprise an opening 24 by means of which air can be fed to the filter element interior space 10 or discharged from the same, which however is not shown in the figures.

In the case of the filter material 2 of FIG. 7, two cut lines 27 are exemplarily marked. Along these cut lines 27, the filter material 2 is trimmed so that on forming the U-geometry 11 of the filter medium 3 from the filter material 2, the end faces 8 of the filter medium 3 are arranged angularly relative to one another. By means of the trimming of the filter material 2 of FIG. 7 along the cut lines 27, a filter medium 3 is thus formed, which corresponds to that example of the filter element 1 of FIG. 3.

Figure 9:
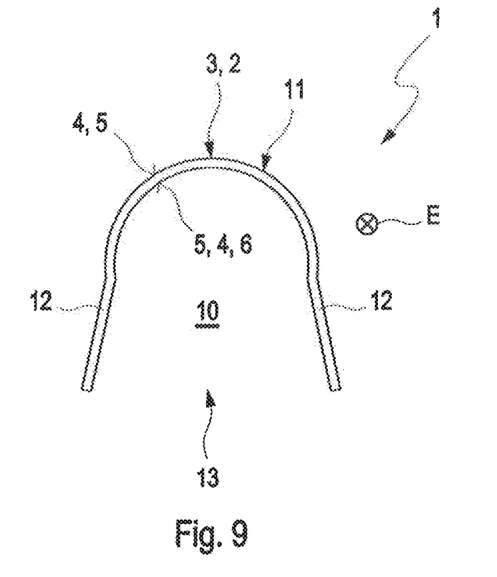
FIGS. 9 through 16 show further examples of filter elements according to the invention each in a section perpendicularly to an extension direction of a filter medium of the filter element.
Figure 10:
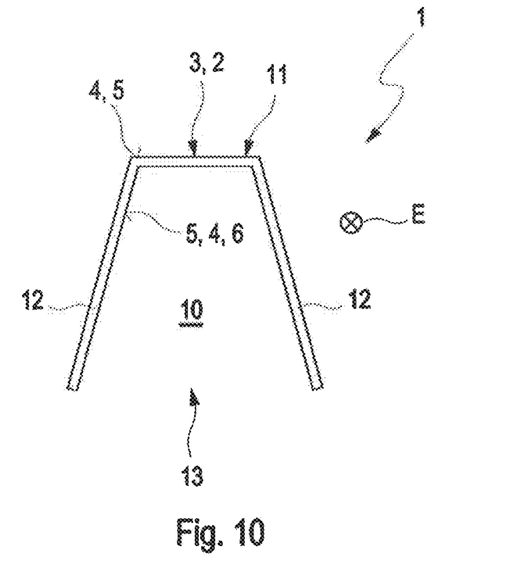
Figure 13:
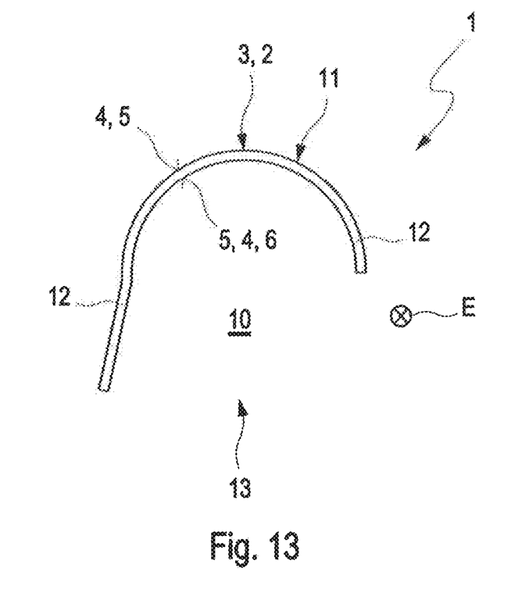
Figure 14:
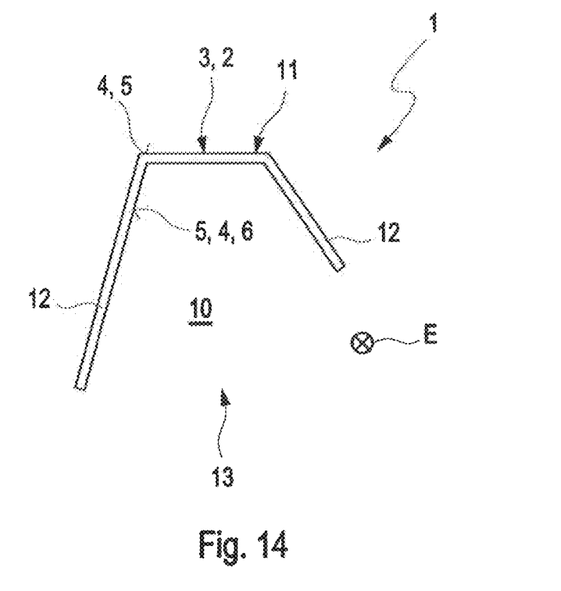

In the FIGS. 9, 10 as well as 13 and 14, further examples of filter elements 1 according to the invention each in a section perpendicularly to the extension direction E of the filter medium 3 are shown. It is noticeable that the U-geometry of the filter medium 3 can be formed continuously curved (FIGS. 9 and 13) or folded multiple times (FIGS. 10, 14), i.e. discontinuously. There, the U-geometry 11 in the case of the filter medium 3 of the examples of the FIGS. 9 and 10 is formed axisymmetrically. Contrary to this, the FIGS. 13 and 14 show a non-axisymmetrical formation of the U-geometry 11.

Figure 11:
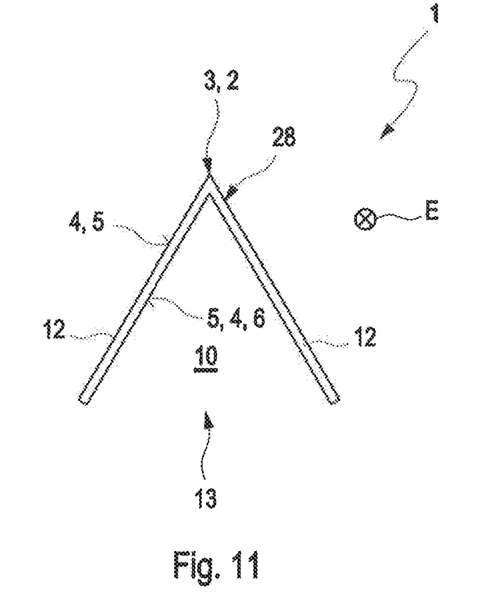
Figure 12:
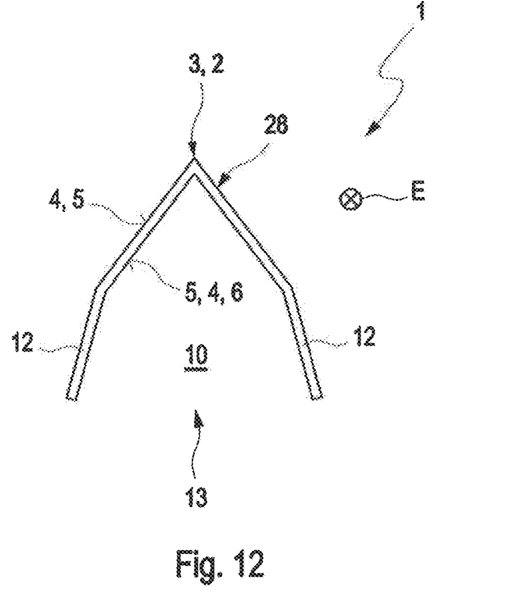
Figure 15:
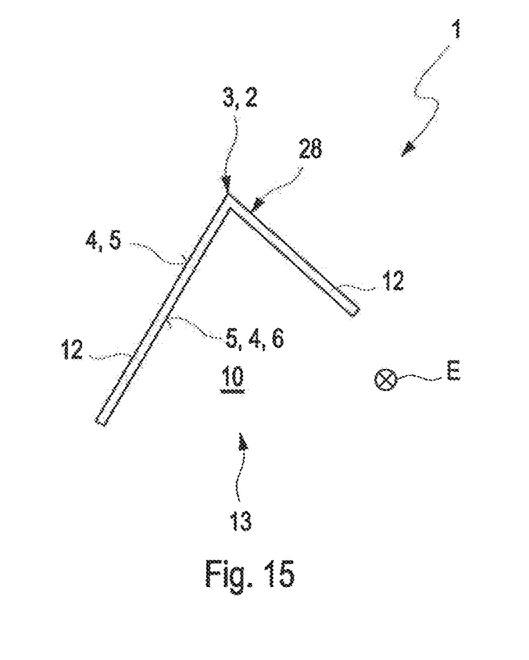
Figure 16:
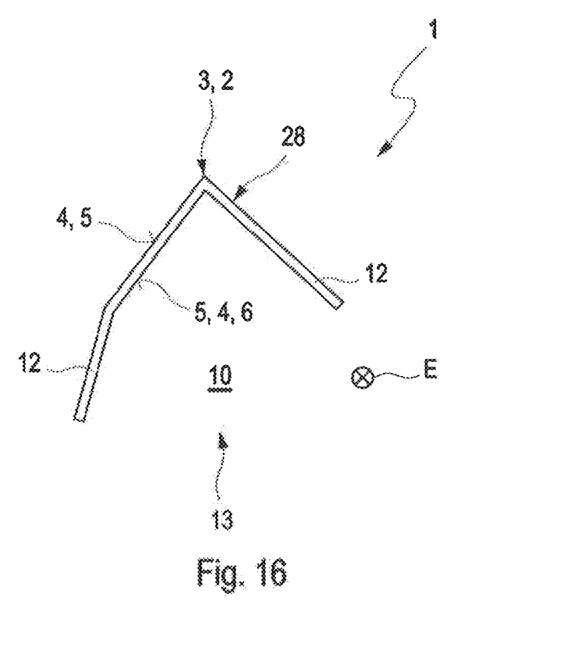

In the FIGS. 11, 12 as well as 15 and 16, further examples of filter elements 1 according to the invention are shown each in a section perpendicularly to the extension direction E of the filter medium 3. Alternatively to the examples described above, it is noticeable that the filter medium 3 in the section perpendicularly to the extension direction E has a V-geometry 28 with two legs 12. It is noticeable that at least one of the legs 12 of the V-geometry 28 can be formed flat (FIGS. 11, 15 and 16) or curved (FIGS. 12, 16) in regions. There, the V-geometry 28 in the case of the filter medium 3 of the examples of FIGS. 11 and 12 is formed axisymmetrically. Contrary to this, the FIGS. 15 and 16 show a non-axisymmetrical formation of the V-geometry 28.

Figure 17:
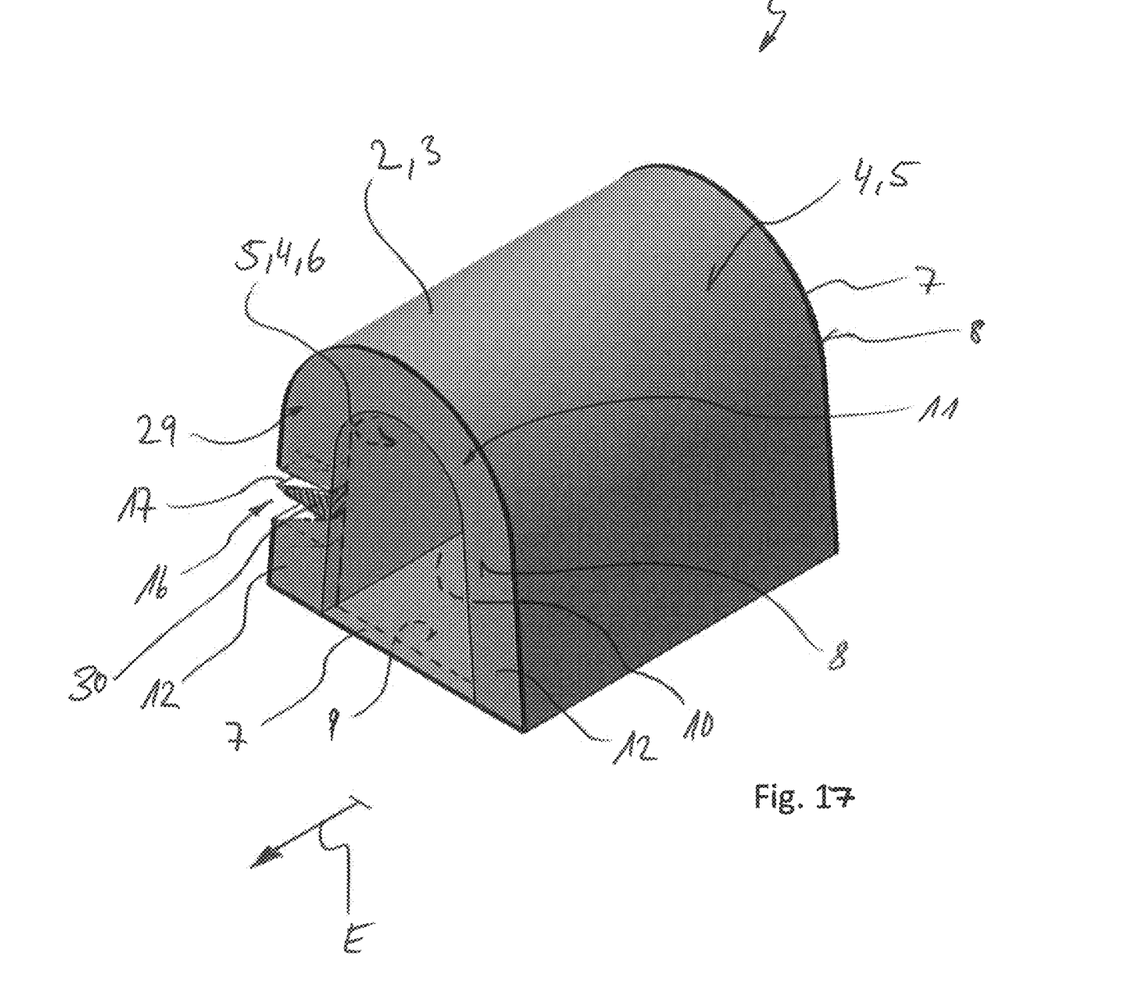
FIG. 17 shows a further example of a filter element according to the invention in a perspective representation.

FIG. 17 shows a further example of the filter element 1 according to the invention in a perspective representation. According to the example of FIG. 17, at least one of the sealing elements 7, viewing along the extension direction E, is smaller in terms of area than an areal content of the end face 8, on which the sealing element concerned is arranged, wherein this sealing element can be arranged within the filter element interior space at least in regions. The end faces 8 of the filter medium 3 each comprise an edge region 29 facing away from the filter element interior space 10. The edge region 29 of at least one end face 8 is free of the sealing element arranged at the end face 8 concerned at least in sections, in the exemplary scenario completely. Looking along the extension direction E, the edge region 29 has an open U-geometry or V-geometry which follows the inner circumferential side 9 of the filter medium 3.

It is evident in FIG. 17, furthermore, that on the inner circumferential side 9 of the filter medium 3 the pleats 16, in the region of at least one of the end faces 8 of the filter medium 3, are closed by means of a pocket bonding 30 along the extension direction E in an air-impermeable manner. There, the pleats 16 are free of pocket bonding located opposite the inner circumferential side 9 (meaning those pleats 16 that open outwards) so that the relevant edge region 29 facing away from the inner circumferential side 9 is air-permeable along the extension direction E. At at least one of the end faces 8, the filter element interior space 10 is completely closed by means of the pocket bonding 30 and the sealing element 7 arranged at this end face 8 along the extension direction E in a fluid-tight or air-tight manner. Alternatively, the filter element interior space 10, when the sealing element 7 as in the example of FIG. 1 has an opening 24, can be sealed in a fluid-tight or air-tight manner in a region apart from the opening 24. The sealing element 7 can be inserted into the U- or V-shaped opening of the filter element interior 10 at the respective face side 8 and bonded to the inner circumferential side 6 of the filter medium 3, as well as—if present—to the end plate 25. The sealing element 7 can be bonded to the filter medium 3 by means of the pocket bonding 30. According to FIG. 17, the pocket bonding 30 complements the sealing element 7 present at the same end face 8 in function and geometry.

The invention claimed is:

1. A filter element for a filtering device, comprising:
a filter medium extending in an extension direction and including a filter material, which separates a clean side of the filter element from a raw side of the filter element;
two seals, which are arranged at two end faces of the filter medium located opposite one another in the extension direction, so that an inner side of each seal is arranged lying against the associated end face in a fluid-tight manner;
wherein the two inner sides of the seals, jointly with an inner circumferential side of the filter medium, partly limit a filter element interior space;
wherein the filter medium, in a section running perpendicularly to the extension direction, has an open U-geometry or V-geometry with two legs;
wherein the end faces of the filter medium each have an edge region facing away from the filter element interior space; and
wherein the edge region of at least one end face is at least partially free of the seal arranged at the respective end face.

2. The filter element according to claim 1, wherein the filter element interior space tapers from a first of the two end faces to a second of the two end faces in the extension direction.

3. The filter element according to claim 1, wherein:
the two legs each form a terminal surface of the filter medium at an end that is open in the section running perpendicularly to the extension direction of the U-geometry or V-geometry; and
the two terminal surfaces each formed by one of the legs are arranged one of (i) parallel to one another and (ii) at an angle to one another.

4. The filter element according to claim 1, wherein:
the two legs each form a terminal surface of the filter medium at an end that is open in the section running perpendicularly to the extension direction of the U-geometry or V-geometry; and
at least one of the two terminal surfaces extends from one of the two end faces to the other of the two end faces transversely relative to the extension direction.

5. The filter element according to claim 1, wherein the filter medium with U-geometry or V-geometry is formed axisymmetrically in the section running perpendicularly to the extension direction.

6. The filter element according to claim 1, wherein:
the filter medium is formed non-axisymmetrically; and
the two legs are formed distinct from one another.

7. The filter element according to claim 1, wherein the end faces of the filter medium are arranged angularly to one another.

8. The filter element according to claim 1, wherein the filter material of the filter medium includes multiple pleats running along the extension direction with pleat tips, wherein the pleat tips of at least two adjacent pleats are arranged spaced apart from one another in the section running perpendicularly to the extension direction.

9. The filter element according to claim 8, wherein the filter material is formed from a flat product, which includes a structuring with elevations and which is pleated in such a manner that the structuring of the filter material determines a minimum value of a spacing of adjacent pleat tips.

10. The filter element according to claim 8, wherein:
the pleat tips are fixed to one another in a spacing from one another via a fixing, which connects the pleat tips by bridging the spacing of each two adjacent pleat tips; and
the fixing is a strand-like bead of one of a polymer and an adhesive.

11. The filter element according to claim 8, wherein distances of the pleat tips of at least two adjacent pleats are distinct in the section running perpendicularly to the extension direction.

12. The filter element according to claim 1, wherein the filter medium is supported on a support, which is arranged on the inner circumferential side.

13. The filter element according to claim 1, wherein:
at least one of the seals includes an opening via which air is able to be fed to or discharged out of the filter element interior space; and
a terminal plate is arranged lying against the terminal surfaces of the legs of the filter medium and the seals in a fluid-tight manner.

14. The filter element according to claim 1, wherein at least one of the seals is formed plate-like.

15. The filter element according to claim 1, wherein at least one of the seals in a plan view of the end face along the extension direction is smaller in terms of area than an area content of the end face, on which the respective seal is arranged.

16. The filter element according to claim 1, wherein the edge region, in a plan view of the end faces along the extension direction, has an open U-geometry or V-geometry, which follows the inner circumferential side of the filter medium.

17. The filter element according to claim 1, wherein:
the filter material of the filter medium includes multiple pleats running along the extension direction with pleat tips, wherein the pleat tips of at least two adjacent pleats are arranged spaced apart from one another in the section running perpendicularly to the extension direction;
on the inner circumferential side of the filter medium the pleats are air-impermeably sealed in a region of at least one of the end faces of the filter medium via a pocket bonding along the extension direction; and
the pleats located opposite the inner circumferential side are free of pocket bonding, so that the respective edge region facing away from the inner circumferential side is air-permeable along the extension direction.

18. The filter element according to claim 17, wherein the filter element interior space, at at least one of the end faces, is sealed in a fluid-tight manner via the pocket bonding and the seal arranged at the at least one of the end faces along the extension direction completely or in a region apart from an opening in at least one of the seals via which air is able to be fed to or discharged out of the filter element interior space.

19. The filter element according to claim 17, wherein the pocket bonding complements the seal at the same end face in function and geometry.

* * * * *